United States Patent [19]
Chak

[11] Patent Number: 5,456,812
[45] Date of Patent: Oct. 10, 1995

[54] DEVICE FOR SILVERIZING WATER

[76] Inventor: Maryan Chak, 303 Webster Ave. #5G, Brooklyn, N.Y. 11230

[21] Appl. No.: 260,459

[22] Filed: Jun. 14, 1994

[51] Int. Cl.$^6$ ..................................... C02F 1/46
[52] U.S. Cl. .................. 204/225; 204/271; 204/286
[58] Field of Search ................... 204/225, 271, 204/286, 297 R

[56] References Cited

U.S. PATENT DOCUMENTS

| 1,446,029 | 2/1923 | Beidler | 204/271 |
| 2,042,534 | 6/1936 | Krause | 204/271 |
| 4,889,608 | 12/1989 | Eickmann | 204/212 |

*Primary Examiner*—John Niebling
*Assistant Examiner*—Brendan Mee
*Attorney, Agent, or Firm*—Ilya Zborovsky

[57] ABSTRACT

A device for silverizing water comprises an electrode head provided with two electrodes of which at least one electrode is a silver containing electrode, means for supplying current to said electrodes, a housing provided with a cavity, and connecting means for connecting said electrode head with said housing turnably between a working position in which said electrode head is located outside said housing so that said electrode can be introduced in a reservoir with water, and a storage position in which said electrode head is turned back into said cavity of said housing.

11 Claims, 5 Drawing Sheets

F I G. 1
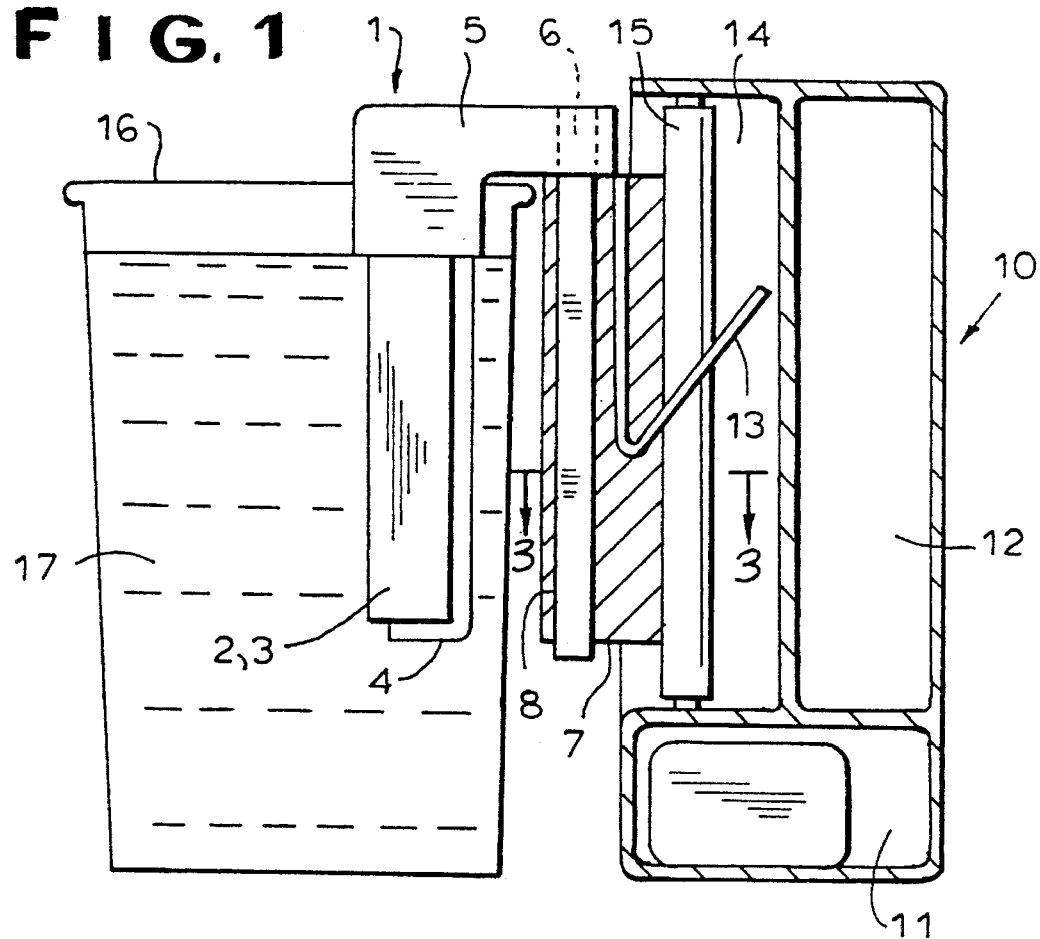
F I G. 2
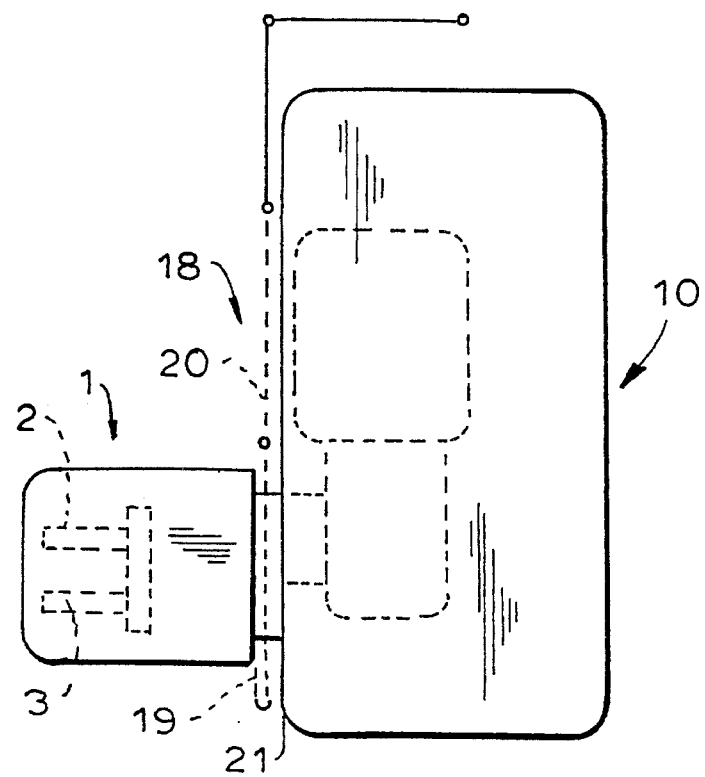

DEVICE FOR SILVERIZING WATER

BACKGROUND OF THE INVENTION

The present invention relates generally to devices for silverizing water.

Devices of the above mentioned general type are known in the art. A known silverizing device includes two electrodes of which at least one is a silver-containing electrode, and electrical circuitry for current supply to the electrode. When the electrodes are inserted into water, positive ions of silver are produced, which possess bactericidal action and clean the water from pathogenic microorganisms. While known silverizing devices successfully achieve their goals, they possess some difficulties in manipulation with the electrodes for introducing them into desired water reservoirs, for example in cups, mugs, pots, etc.

SUMMARY OF THE INVENTION

Accordingly, it is an object of the present invention to provide a silverizing device which avoids the disadvantages of the prior art.

More particularly, it is an object of the present invention to provide such a silverizing device in which the electrodes can be easily introduced in relatively small containers with water.

In keeping with these objects and with others which will become apparent hereinafter, one feature of the present invention resides, briefly stated, in a silverizing device which has an electrode head carrying electrodes of which at least one of the electrodes is a silver containing electrode, and a housing accommodating means for a current supply to the electrodes, the housing being provided with a cavity, and the electrode head is arranged turnably between a storage position in which it is accommodated in the cavity of the housing, and a working position in which it is withdrawn from the housing so that the electrodes are exposed for introducing into a water reservoir.

When the silverizing device is designed in accordance with the present invention, it is easy to manipulate, the electrodes can be easily withdrawn from the housing and introduced into a container with water, and then after the working cycle the electrodes can be turned back into the housing and heated there for storage.

In accordance with another embodiment of the present invention, the electrode head, upon withdrawal from the housing, can be adjusted vertically, so as to facilitate its insertion into a container with water.

Still a further feature of the present invention is that means are provided for returning the electrode heads to their initial lower position after moving them to their higher position for introducing into a container with water. This means can be formed as spring means.

In accordance with a further feature of the present invention, closing means can be provided for closing the cavity in the housing after the introduction of the electrode into the cavity of the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of a device for silverizing water and a cup with water to be silverized;

FIG. 2 is a plan view of the device for silverizing water of FIG. 1;

DESCRIPTION OF THE PREFERRED EMBODIMENTS

Figure 3:
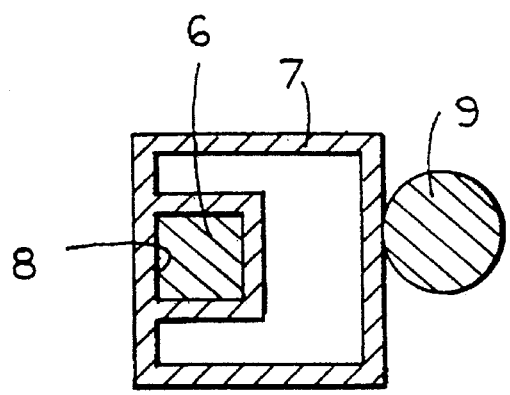
FIG. 3 is a view showing a section taken along the line III—III in FIG. 1.

A device for silverizing water has an electrode head which is identified as a whole with reference numeral 1. The electrode head has at least two electrodes 2 and 3, of which at least one electrode is a silver containing electrode. The electrodes can be connected with one another by a non-conductive strip 4, for example of a synthetic plastic material. The electrodes and the strip are mounted on a bridge 5. One part of the bridge 5 carries the electrodes 2, 3 and the strip 4, while the other part of the bridge 5 is fixedly connected with an axle 6. The axle 6 has one end extending through an opening in the bridge 5 and is connected with the bridge for example by welding.

The device further has a holder 7 provided with a vertical opening 8. The axle 6 extends through the opening 8. The axle 6 and the opening 8 in the holder 7 can have a non-circular, for example, square cross-section, as shown in FIG. 3. The holder 7 is fixedly connected with an axle 9 for example by welding.

The silverizing device in accordance with the present invention further has a housing which is identified as a whole with reference numeral 10. The housing 10 has a first compartment 11 which can accommodate a battery, and a second compartment 12 which can accommodate electrical means for supplying the current from the electrical battery 11 through electrical conductors 13 to the electrodes. Finally, the housing has a third chamber 14 which accommodates an axle 15. The axle 15 is supported turnably in the upper and lower walls of the housing 10. The compartment 14 forms a storage cavity as will be explained hereinbelow.

In a working position shown in FIG. 1, the electrode head 11 extends substantially perpendicularly to the housing 10 and is electrodes 2, 3 can be introduced in a container 16 with a body of water 17. Upon actuating of a not shown switch, the battery 11 supplies electric current to the electrodes of opposite polarity, and the water 17 in the container 16 is saturated with positive silver ions from the silver containing electrode. After a desired cycle of silverizing, the electrode head 11 is turned about an axis of the axle 15 from the position shown in solid line in FIG. 2 to the position shown in a broken line in the same Figure. The electrode head is brought into the cavity 14 of the housing and remains there during a storage period.

A door 18 can be provided for closing the cavity 14o The door can include two flaps 19 and 20 connected with one another by a hinge, of which the flap 20 is also connected to the housing 10 by a hinge. A locking member 21 is attached to the housing 10. In the position of storage of the electrode head 11 shown in broken line in FIG. 2, the door 18 is arranged so that their two flaps 19 and 20 cover an opening of the cavity 14, and the door 18 is locked by the member 21. For turning the electrode head to the position shown in solid line in FIG. 2, the door is turned around its main hinge which connects the flap 20 to the housing, and the flap 19 is turned around the hinge which connects this flap with the flap 20, so that the door assumes the position shown in the solid line in FIG. 2.

Figure 4:
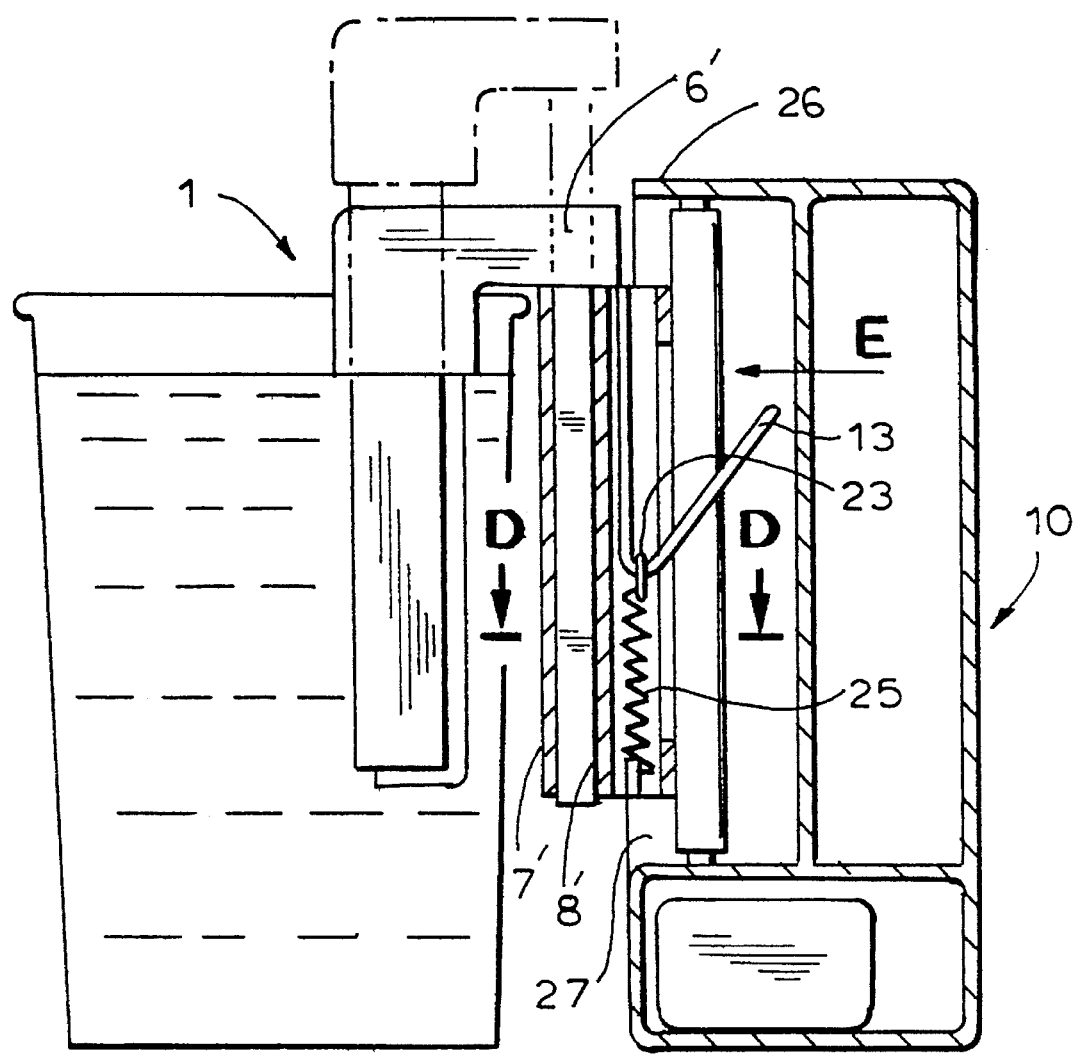
FIG. 4 is a view showing a further modification of the device for silverizing water in accordance with the present invention.

A further embodiment of the present invention is shown in FIG. 4. In the device for silverizing water in accordance with this embodiment, the axle 6' is received in the opening 8' of the holder 7' in a sliding manner. As can be seen from FIG. 4, due to this arrangement, the electrode head 1 can be moved upwardly and downwardly due to the sliding of the axle 6' in the holder 7'. When the electrode head is moved upwardly, it is easy to introduce the electrodes into the container with water. Then in the upper position of the electrode head shown in broken line, the user releases the electrode head and it is pulled back to its lower position by a spring 25. The spring 25 is accommodated in an opening 26 of the holder 7'. It has one end connected to a bottom 27 of the opening 26 and another end which is provided with a loop 28. The electrical conduits 13 extend through the loop 28 and are fixedly connected with the loop, for example by soldering. During lifting the electrode head upwardly, the spring 25 is expanded, and then when the use releases the electrode head the spring 25 is compressed and pulls the electrode head downwardly.

It should be emphasized that both in the embodiment of FIG. 1 and the embodiment of FIG. 4 the axles 6 and 6' can be received in the openings 8 and 8' of the holder 7 and 7' removably. In other words, the heads 1 can be displaced upwardly so that the axles 6 and 6' are completely withdrawn from the openings 8 and 8', the electrodes are introduced into the container with water, and then the axles 6 and 6' are again inserted into the openings 8 and 8, respectively.

Figure 5:
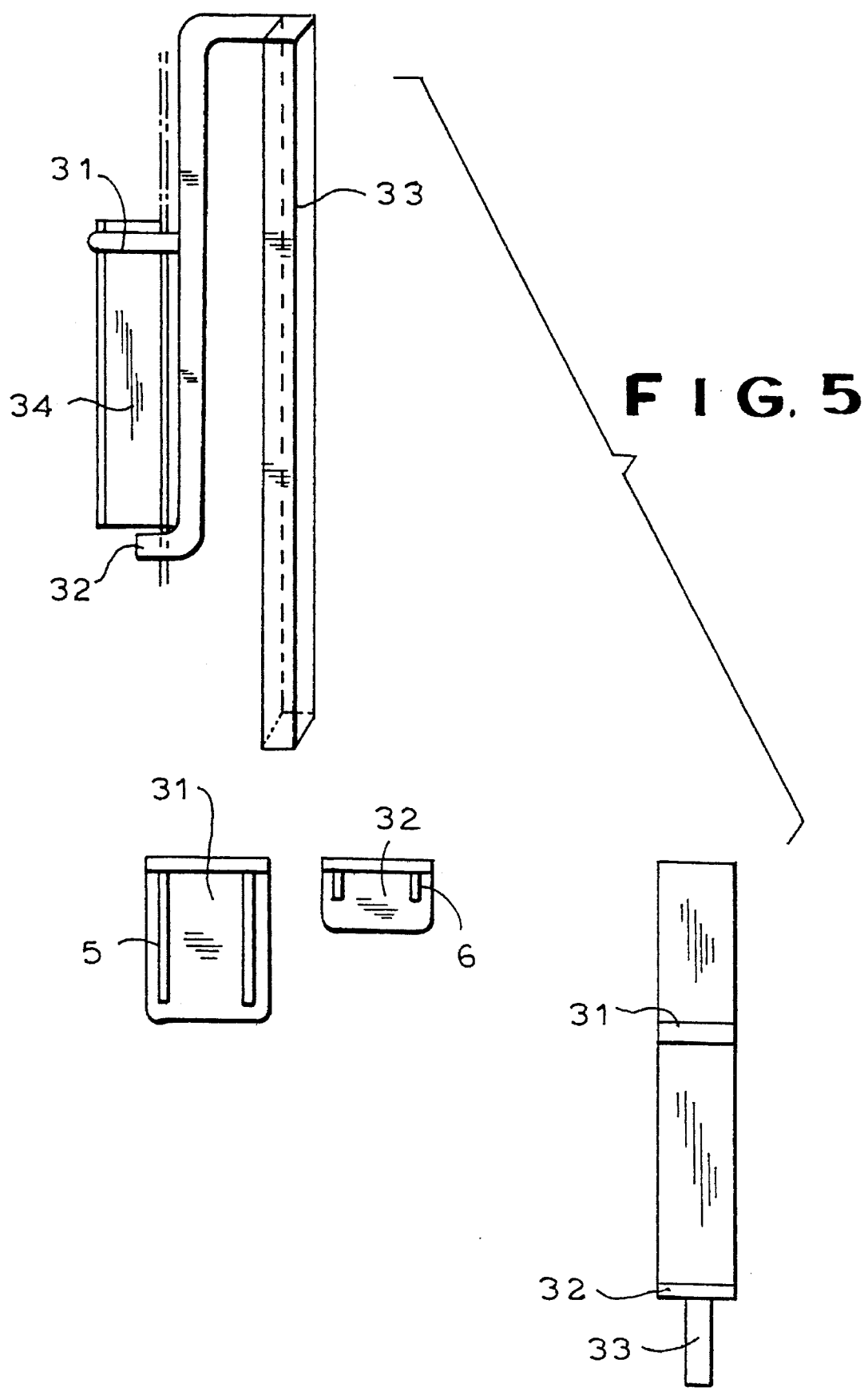
FIG. 5 shows details of a support for the electrodes.

FIG. 5 shows a support for the electrodes in accordance with another embodiment. It has an upper strip 31 which carries electrodes 34, a lower strip 32 which also supports the electrodes, and a square-shaped holder. Openings for the electrodes in the upper strip and in the lower strip are identified as 35 and 36.

In the embodiment of FIGS. 6–9, the housing 10 is composed of two parts 10' and 10". The part 10" is turnable relative to the part 10' around the axle 6' between an open position shown in broken line and a closed position shown in solid line in FIG. 8. The part 10" has a projection 18' cooperating with the part 10" and locked with one another by a locking element 36. It also has a projection 18" designed in a special inventive way. In the position shown in solid lines in FIG. 8, the device is closed. When the housing part 10" is turned as shown in broken lines, the projection 18" pushes the electrodes outwardly of the interior of the housing 10, so that subsequently they can be inserted into a container with water etc. As in the previous embodiment the electrodes 2', 3' are arranged on the holder 7' which is connected with a holding element 7".

Figure 6:
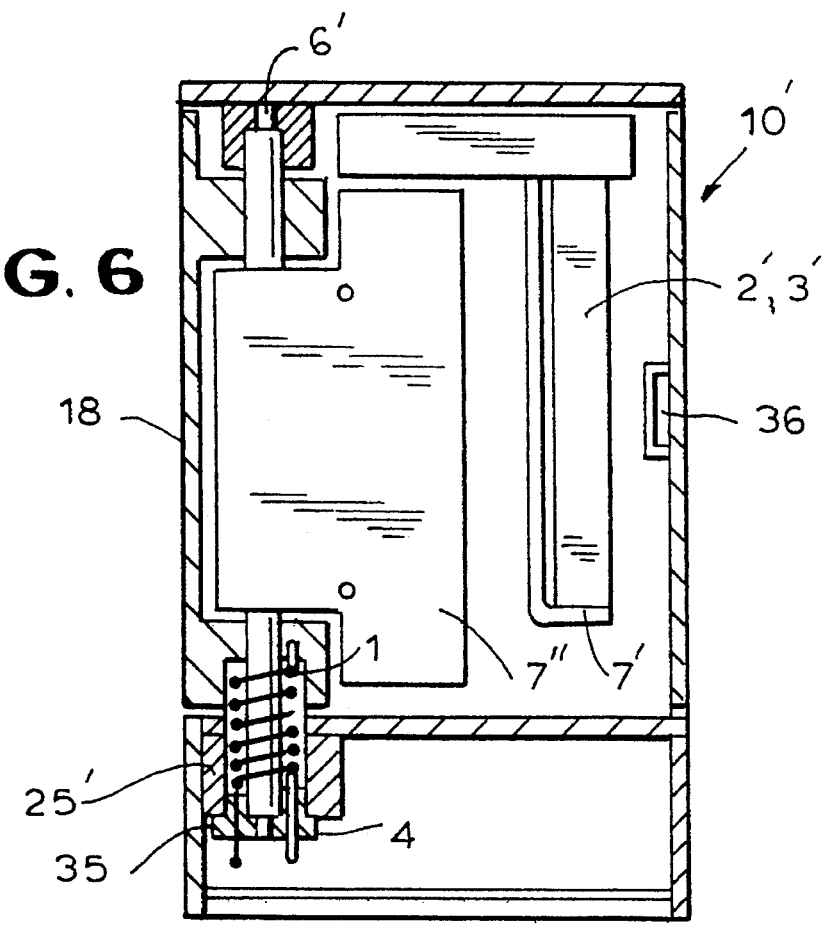
FIG. 6 is a view showing a further modification of the device in accordance with the present invention.
Figure 7:
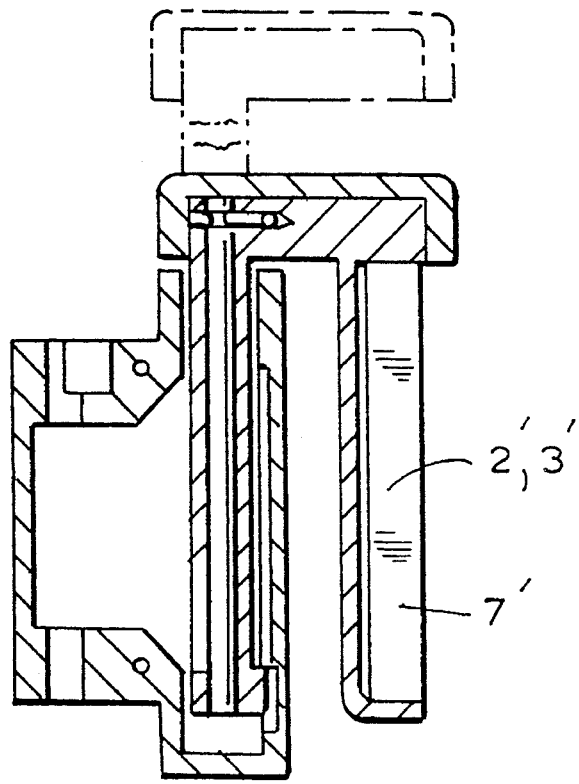
FIG. 7 is a view showing an electrode unit of the further modification of the device of FIG. 7.
Figure 9:
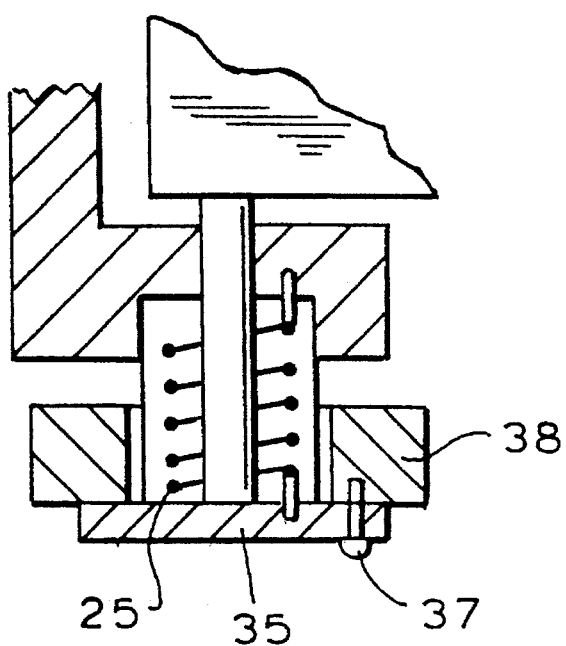
FIG. 9 is an enlarged view of the lower part of the inventive device of FIG. 6.
Figure 8:
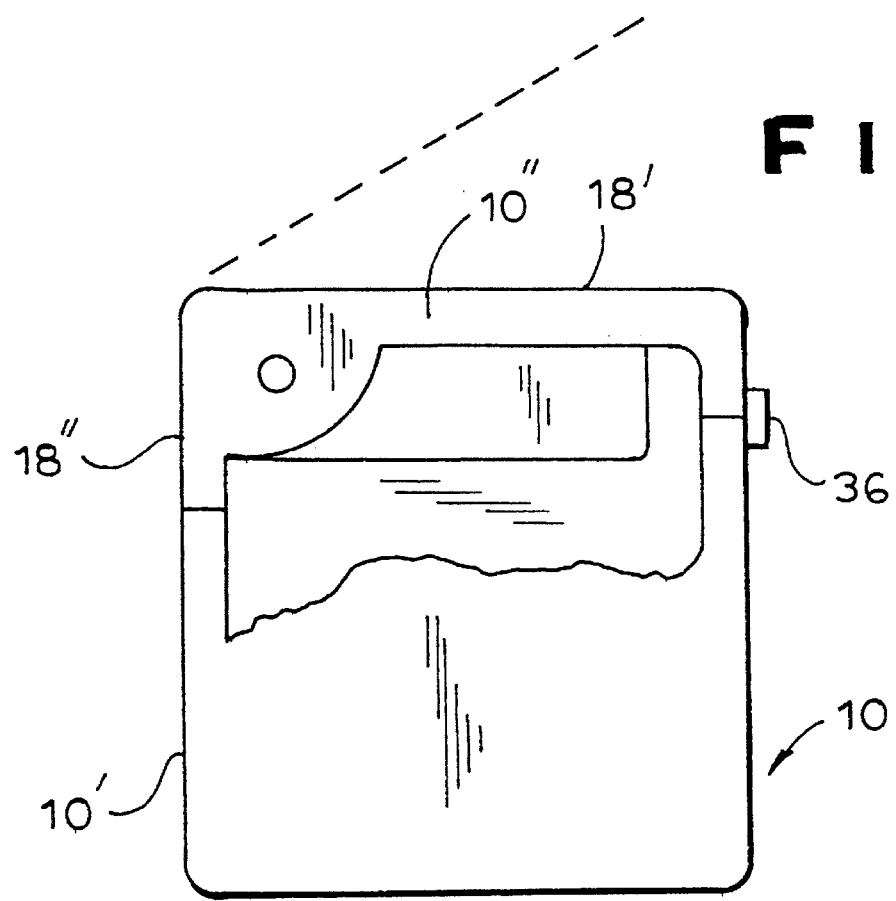
FIG. 8 is a plan view of the inventive device of FIG. 6.

As shown in FIG. 6, a spring 25' is provided between the housing part 18' and an additional perforated disc 35 provided with a plurality of circumferentially spaced openings. One end of the spring engages in the housing part 10", while another end of the spring is connected with the disc 35. The spring 25' performs two functions. First of all, it operates as a twisting spring, so that it can turn the housing part 10" from the open position shown in broken lines to the closed position shown in solid lines in FIG. 8. Secondly, it also spring biases the housing in the direction of the axle 6'. A pin 37 is mounted in a part of the housing 38 and can be engaged in any of the openings of the disc 35, so as to adjust the tensioning of the spring 25'.

It will be understood that each of the elements described above, or two or more together, may also find a useful application in other types of constructions differing from the types described above.

While the invention has been illustrated and described as embodied in a device for silverizing water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for silverizing water, comprising an electrode head provided with two electrodes of which at least one electrode is a silver containing electrode; means for supplying current to said electrodes; a housing provided with a cavity; connecting means for connecting said electrode head with said housing turnably between a working position in which said electrode head is located outside said housing so that said electrode can be introduced in a reservoir with water, and a storage position in which said electrode head is turned back into said cavity of said housing; support means for said electrodes and including a support provided with an upper strip in which said two electrodes are supported from above and a lower strip in which said two electrodes are supported from below.

2. A device for silverizing water as defined in claim 1, wherein said electrode head is movable relative to said housing in a vertical direction in its working position.

3. A device for silverizing water as defined in claim 2; and further comprising means for automatically returning said electrode head to its lower position after a user has lifted said electrode head to its upper position and released said electrode head.

4. A device for silverizing water as defined in claim 3, wherein said returning means includes spring means.

5. A device for silverizing water as defined in claim 4; and further comprising an electrical conductor extending from said current supply means to said electrode head, said spring means including a spring having one end connected with said housing and another end connected with said electrical conductor so as to pull said electrical conductor downwardly and therefore to pull said electrode head downwardly after the user releases said electrode head.

6. A device for silverizing water as defined in claim 4, wherein said holder has an opening through which said further axle extends, said further axle and said opening in said holder having a non-circular cross-section.

7. A device for silverizing water as defined in claim 6, wherein said opening in said holder and said further axle has a square cross-section.

8. A device for silverizing water as defined in claim 1, wherein said housing has two housing parts which are turnable relative to one another between an open position in which an interior of the housing is open and said electrode head is moved outwardly of said housing, and a closed position in which said electrode head is moved back into the interior of the housing and said housing is closed.

9. A device for silverizing water as defined in claim 8, wherein one of said housing parts has a projection which is operative for moving said electrode head outwardly of said housing.

10. A device for silverizing water as defined in claim 8; and further comprising spring means arranged so as to move at least one of said housing parts toward said closed position so as to close said housing.

11. A device for silverizing water as defined in claim 10; and further comprising means for adjusting a tensioning force of said spring.

* * * * *